United States Patent Office 3,165,7...
Patented Jan. 12, 19...

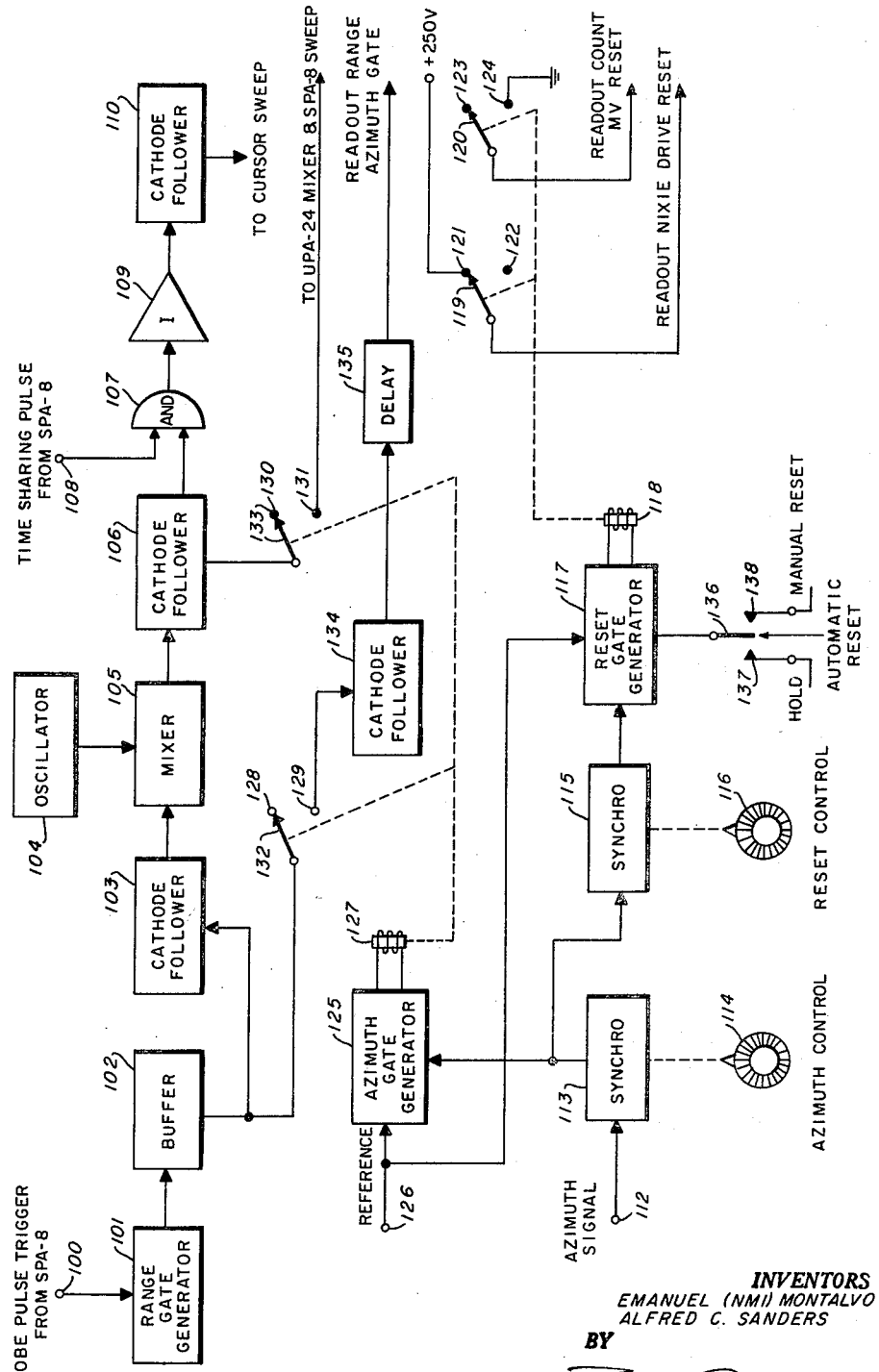

3,165,736
BINARY TO DIGITAL READOUT
AZIMUTH GATING
Emanuel Montalvo, San Diego, and Alfred C. Sanders, Escondido, Calif., assignors to the United States of America as represented by the Secretary of the Navy
Filed Aug. 31, 1962, Ser. No. 220,921
5 Claims. (Cl. 343—6.5)
(Granted under Title 35, U.S. Code (1952), sec. 266)

The invention described herein may be manufactured and used by or for the Government of the United States of America for governmental purposes without the payment of any royalties thereon.

The present invention relates to a gating system and more particularly, to a range system for establishing a range gate and azimuth gate and specifically to a range and azimuth gating system for use in an IFF system.

The present invention relates to a range and azimuth gating system for use in an IFF system such as set forth in copending application No. 169,976, Decoder Readout Degarbler, filed January 30, 1962. In such a system it is necessary to associate a decoded signal with the correct target, range-azimuth and target selection gates. In addition it is desirable to generate a range-brilliance signal which is supplied to the cursor sweep of the display for operator ease in placing the range-azimuth gate on a desired target. It is further desirable that targets closely spaced in azimuth be easily discriminated which again is essentially dependent on the operator's ability to position the range-azimuth gate.

An objective of the present invention is to provide a gating system for use with IFF systems.

An additional object of the invention is to provide a range-azimuth gating system which provides for operator ease in placing the range-azimuth gate on a desired target.

An additional object of the invention is to provide a range-azimuth gating system for use with IFF systems where a discrimination of targets closely spaced in azimuth is readily accomplished.

Various other objects and advantages will appear from the following description of one embodiment of the invention, and the novel features will be pointed out hereinafter in connection with the appended claims.

In order to better understand the objects of the invention not specifically set forth above, reference is made to the accompanying description and figure which illustrates the embodiment of the present invention.

The present invention, as previously stated, is intended for use with the Decoder Readout and Degarbler disclosed in co-pending application 169,976 and forms a part of FIG. 2 of the aforementioned co-pending application.

In the figure, range trigger information from an SPA-8 range strobe, disclosed in NavShips 91737 Instruction Book for Indicator Group AN/SPA8-8A, is coupled to input 100 and from input 100 is coupled to a range gate generator 101. The output of range gate generator 101 is coupled to the input of a buffer 102 one output of which is coupled to a cathode follower 103.

A 750 kc. oscillator 104 is provided and the output of the oscillator is coupled as one input to a mixer 105. The other input to mixer 105 comprises the output of cathode follower 103. The output of mixer 105 is coupled to the input of a cathode follower 106 one output of which is coupled as one input to an AND circuit 107.

The other input to AND circuit 107 comprises an output from the SPA-8 cursor sweep and is coupled to an input 108 and then to the AND circuit 107. The output of AND circuit 107 is coupled through an amplif... inverter 109 to the input of a cathode follower 110. T... output of cathode follower 110 is then adapted for c... pling to the cursor sweep on a CRT, not shown, wh... forms part of the SPA-8.

In addition, antenna position synchro signals are c... pled to an input 112 which in turn are coupled to 5DG synchro 113. Mechanically connected to the 5I... synchro 113 is an azimuth cursor control 114 of t... SPA-8 which may be set as determined by the opera... of the system. The output of the 5DG synchro 113 also coupled to the input of a 1DG synchro 115 whi... has a reset angle from a cursor control 116 mecha... cally coupled thereto. Both the 5DG and 1DG synch... are illustrated and described in available literature. Th... are both differential generator synchros of different si... The designation 5 in counter distinction to 1 indica... that the 5 will drive more repeaters i.e. has a higher o... put than the 1 series. The output of the 1DG synch 115 is coupled to the input of a reset gate generator rel... drive 117 the output of which is coupled to a reset rel... coil 118. The reset relay coil 118 causes movable rel... sections 119 and 120 to move between stationary co... tacts 121, 122 and 123 and 124 respectively. In t... unactivated position relay sections 119 and 120 are contact with stationary contacts 121 and 123 resp... tively. When activated by coil 118 relay sections 1... and 120, are engaged with stationary contacts 122 a... 124 respectively, connected to contact 121 is a 250 v... supply and contact 122 is open, stationary contact 124 connected to ground and contact 123 is open.

Also connected to the reset gate generator 117 is t... output from a single pole switch capable of moveme... between three positions. The switch comprises a mo... able leaf 136 and stationary contacts 137 and 138. Co... tact 137, corresponds to a hold position, contact 1... corresponds to a manual reset position, and the cent... position as shown corresponds to automatic reset.

The output from the 5DG synchro 113 is also coupl... as an input to an azimuth gate generator relay driver 12... Another input to driver 125 comprises a 60 cycle re... erence coupled from an input 126. The output of driv 124 is used to energize coil 127 of a double pole doub... throw relay having stationary contacts 128, 129 and 13... 131 and associated therewith, movable relay sectio... 132 and 133 respectively.

The output of buffer 102 is coupled to relay secti... 132 and stationary contact 128 is open. Stationary co... tact 129 is coupled to a cathode follower 134 the ou... put of which is coupled to a delay line 135. The outp... of the delay line 135 is adapted for connection to furth... circuitry in the IFF system disclosed in co-pending app... cation No. 169,976.

An output from cathode follower 106 is coupled... relay section 133 and relay contact 130 is open. Statio... ary contact 131 is adapted for connection to a UPA-... (described in NavShips 92119(A) Instruction Book f... Decoder Group AN/UPA-24) and then to the sweep ... the SPA-8, not shown.

In the operation of the system, starting with the stro... pulse trigger from the SPA-8 coupled to input 100; ... range gate is generated in range gate generator 101 f... every pulse from the SPA-8. This output is coupl... to buffer 102 the output of which is coupled to the cat... ode follower 103 which is used for isolation purposes a... then to mixer 105. Also coupled to mixer 105 is the ou... put of the 750 kc. oscillator 104 which is used to mod... late the pulses from cathode follower 103. The output ... mixer 105 is then coupled through cathode follower 1... for isolation purposes and introduced as one input ... AND gate 107. The other input to AND gate 107 e shared pulse from the SPA-8 coupled to input
This time shared pulse occurs on every tenth pulse
strobe. Therefore, nine pulses will appear at in-
0 and on the tenth pulse a pulse appears at input
d enables AND gate 107 and an output will appear
utput of AND gate 107.
output from AND gate 107 is coupled to an
er inverter 109 and through a cathode follower 110
lation purposes and is adapted for connection to
rsor display on an SPA-8. This will be an RF
ated gate which may be varied between 0 and 40
econds in length. This variability in length is ob-
through a control, not shown, on the range gate
tor 101.
750 kc. oscillator is used to provide a shaded
gate so that a shaded area surrounds the selected
on the CRT of the SPA-8. This is done for oper-
se in selecting various targets.
output of buffer 102 is also connected to movable
ection 132 which in its unactivated position en-
with stationary contact with 128 which is open.
activated position relay section 132 engages sta-
contact 129 and the output of buffer 102 is con-
through cathode follower 134 for isolation pur-
to the input of delay line 135. The delay line
used to compensate for delay caused by the de-
delay line disclosed in co-pending application
No. 169,976. The output of the delay line 135
onds to a readout-range-azimuth gate.
output from cathode follower 106 is also coupled
rable relay section 133 which in its normal posi-
gages stationary contact 130 which is open. In
ivated position movable relay section 133 engages
ary contact 131 and the output of cathode follower
coupled to stationary contact 131 as an RF modu-
ideo range-azimuth gate. This gate is then coupled
'A-24 mixer, not shown, and then to the sweep, not
on a SPA-8.
cident with the operation of the above circuitry
enna position synchro signal is coupled from input
a 5DG synchro 113. The output of the 5DG
113 is coupled as one input to the azimuth gate
tor relay driver 125. The output of the 5DG
113 corresponds to a 3 phase sine wave which
displaced with respect to the 60 cycle reference
d from input 126 to the relay driver 125 by the
h position cursor 114. When the vector summa-
the 60 cycle reference coupled in on 126 and the
of the 5DG synchro 113 reaches a predetermined
the relay driver will energize the relay coil 127
e movable contacts 132 and 133 will be moved
he position shown in the figure to gage stationary
s 129 and 131 respectively.
his time a readout pulse will be applied which will
the Nixie tubes to be energized as disclosed in
ding application 169,976.
rder to reset the Nixie drives and the readout
multivibrators disclosed in the co-pending applica-
9,976 the output of the 5DG synchro is also cou-
the input of a 1DG synchro 115. The readout
hase of the 1DG synchro 115 is set with respect
azimuth position as indicated in the output of the
ynchro 113 by means of the readout reset phase
l 116. Once this is set the reset will occur at a
rmined number of degrees with respect to the
t as determined by the azimuth position cursor
l 114.
width of the azimuth gate may be controlled by a
l, not shown, on the azimuth gate generator relay
125 from anywhere in width from 5° to 120°.
matic reset is accomplished from approximately
45° of antenna rotation after readout by manually
ning the rotor of the 1DG synchro 115 by means
readout reset phase control 116. Thus, the 60
cycle reference coupled to the reset gate generator relay
drive 117 is vectorily added to the output of the 1DG
synchro 115 and when the vectorial addition reaches a
predetermined level the relay coil 118 is energized and
causes movable relay sections 119 and 120 to engage
stationary contacts 122 and 124 respectively. Relay
contact 122 is opened and therefore the 250 volt drive is
removed from the Nixie tubes disclosed in co-pending
application 169,976. The count multivibrators disclosed
in 169,976 are reset as movable contact 120 engages sta-
tionary contact 124 which is connected to ground.

In addition it may be desirable at times to override
the automatic reset or to manually reset. For this reason
an input is provided to the reset gate generator relay
drive 117 from movable switch contact 136. When
movable switch contact 136 is switched into engagement
with fixed contact 137 the automatic reset is overridden
and the Nixies will remain on in that the relay coil 118
will not be energized until the holding voltage is removed.
When movable switch contact 136 is engaged with con-
tact 138 the automatic reset is overridden and a manual
reset is accomplished.

It will be understood that various changes in the de-
tails, materials, steps and arrangements of parts, which
have been herein described and illustrated in order to
describe the nature of the invention may be made by those
skilled in the art within the principle and scope of the
invention as expressed in the appended claims.

What is claimed is:
1. An azimuth gating system for use with an IFF
system comprising; input means for coupling antenna
position synchro signals thereto; initiating means opera-
tively coupled to said input means and receiving synchro
signals for producing a signal which is adapted for initiat-
ing an azimuth readout; reset means operatively coupled
to said initiating means for producing a signal adapted
to cut-off the readout of azimuth information; range
means adapted for producing range information; gating
means operatively coupled to said range means and said
initiating means for producing an output signal corre-
sponding to a range-azimuth readout signal; shading
means operatively coupled to the output of said range
means for modulating the area of the range gate estab-
lished; output means operatively coupled to the output
of said shading means and said range means; said out-
put means being adapted for coupling to a presentation
display.

2. A gating system for use in an IFF system com-
prising; input means adapted for coupling range informa-
tion thereto; range gate generator means operatively
coupled to said input means for generating a range gate;
range gate shading means operatively coupled to the
output of said range gate generator means for modulating
the area of the range gate established; mixing means oper-
atively coupled to the output of said shading means and
said range gate generator means for mixing the output
of said shading means and said range gate generator
means; output means operatively coupled to the output
of said mixing means adapted for coupling the output of
said mixing means to a display; other input means adapted
for coupling antenna azimuth signals thereto; initiating
means operatively coupled to said other input means for
producing a readout signal; reset means operatively cou-
pled to the output of said initiating means for producing
a signal representative of a reset to stop the readout;
gating means operatively coupled to said initiating means
and the output of said range gate generator means for
gating the output of said range gate generator means and
said initiating means and producing an output signal
representative of a range azimuth gate signal; delay means
operatively coupled to the output of said gating means
for delaying the signal representative of the range-azimuth
gate a predetermined amount; and other output coupling
means coupled to the output of said delay means adapted
for coupling said output signal to an IFF system.

3. A gating system as set forth in claim 2 and further including; manual reset means operatively coupled to the output of said reset means for manually resetting the readout when desired.

4. A gating system as set forth in claim 3 and further including; reset override means incorporated in said manual reset means for overriding the output of said reset means.

5. A gating system as set forth in claim 2 and further including; means for producing a radio frequency modulated gate signal for cursor display comprising; coincidence means having an input operatively coupled the output of said mixing means, another input of se coincidence means operatively receiving a time shari pulse, said coincidence means producing an output wh the output of said mixer means and said time shari pulse are coincident therein; said output of said co: cidence means corresponding to a radio-frequency moc lated gate for a cursor sweep on a CRT display.

No references cited.

CHESTER L. JUSTUS, *Primary Examiner.*